United States Patent [19]

Doumani

[11] 4,073,412
[45] Feb. 14, 1978

[54] EMULSIFIED COOKWARE LUBRICANT HAVING FREEZE-THAW STABILITY

[75] Inventor: Charles Doumani, Los Angeles, Calif.

[73] Assignee: Blue Cross Laboratories, Inc., North Hollywood, Calif.

[21] Appl. No.: 692,486

[22] Filed: June 3, 1976

[51] Int. Cl.$^2$ .................. C08L 91/00; C09K 3/30; B65D 83/14
[52] U.S. Cl. .................. 222/192; 106/244; 106/267; 252/49.5
[58] Field of Search ............ 252/312, 49.5; 106/244, 106/267; 222/192

[56] References Cited

U.S. PATENT DOCUMENTS

| 1,934,005 | 11/1933 | Rewald | 252/312 |
| 3,896,975 | 7/1975 | Follmer | 106/287 R |

FOREIGN PATENT DOCUMENTS 1,302,524  1/1973  United Kingdom ............... 426/609

*Primary Examiner*—Theodore Morris
*Attorney, Agent, or Firm*—Louis J. Bachand

[57] ABSTRACT

Freeze-thaw stable, water-in-oil lecithin emulsion cookware lubricant is obtained with an organic phase free of liquid alkanes having a specific gravity higher than 0.75, and comprising in proportions to provide the composition an acid number not higher than 12: from 1 to 10 parts of a lecithin having an acid number between about 12 and 34; from 0 to about 8 parts of a vegetable oil having an acid number less than about 1; from 1 to 12 parts of a mineral oil having a specific gravity above 0.80; and an emulsifying-effective amount of an edible fatty acid ester emulsifier having an acid number not higher than 15; and therewith up to 85 parts of an inorganic aqueous phase, comprising the balance to 100 parts of the composition, all parts being by weight.

19 Claims, No Drawings

EMULSIFIED COOKWARE LUBRICANT HAVING FREEZE-THAW STABILITY

BACKGROUND OF THE INVENTION

This invention has to do with cookware lubricant compositions based on lecithin. More particularly the invention is concerned with water-in-oil emulsion cookware lubricants stable against freeze-thaw cycles typically encountered in wintertime shipment of product.

As such, the invention relates to improvements in lecithin based cookware lubricant products generally of the type comprising lecithin in a delivery system for thin film application, as a fluid, onto the surface to be lubricated. Commencing perhaps with the invention disclosed in U.S. Pat. No. 2,796,363 to Lalone, the thin film application of fluidized lecithin has been popularized as a healthful, low cost, natural and cholesterol-free way to obtain lubricity on cooking surfaces especially frying pans. In the Lalone patent, in companion Pat. No. 3,038,816 to Drell and Rubin and in its commercial counterpart PAM, the lecithin or equivalent ester is dissolved in a fluorocarbon propellant; the solution upon being sprayed volatilizes off the propellant leaving a fine mist of lecithin coming out of solution onto the pan surface being treated.

The increasing cost of fluorocarbon propellants, in dollars owing to the petrochemical supply situation, and in social terms because of supposed impact upon the earth's ozone layer of released fluorocarbons, has caused manufacturers to look to alternatives to fluorocarbon solutions of lecithin. One effort is recorded in U.S. Pat. No. 3,661,605 to Rubin and Meyerhoff, wherein a specific hydroxylated form of lecithin was found to be emulsifiable in water and to be propellable with nonfluorocarbon propellants. No commercial use of the Rubin-Meyerhoff is known to me.

Another worker in the art patented a water-in-oil emulsion system which obtained good dispersion of lecithin without use of fluorocarbons, at substantially lower cost and with other attendant economic and social benefits described in U.S. Pat. No. 3,896,975 to Follmer. The product has been commercially sold under the trademark PAN PAL.

It has been found that upon exposure to freezing temperatures, sometimes followed by a warmer condition, and then colder as may be encountered in winter shipments of product in the continental Midwest and Northeast, that a breakdown of the lecithin water-in-oil emulsion is experienced, limiting the utility of the product and causing consumer dissatisfaction based on clogging of delivery nozzles, abnormal appearance of the product, odor or inadequacy of lubricity.

SUMMARY OF THE INVENTION

It is an object of the present invention to retain the manifold advantages of a lecithin water-in-oil emulsion product deliverable by nonfluorocarbon propellant and to add thereto the further advantage of freeze-thaw stability, i.e. the ability to cycle through colder, even freezing, and then warmer, then colder temperature regimes without loss of emulsion, lubricating effectiveness, desired appearance or other wanted characteristics.

It has been found that elimination of freeze-thaw cycle problems without loss of the other desirable attributes of the Follmer-type composition necessitates adjustment of all components of the system relative to each other and does not admit of mere use of additives in known systems. Further, control of overall acid number for the composition appears to be a major factor in arriving at the desired balance of system components.

More specifically then, the present invention provides a freeze-thaw stable, water-in-oil emulsion composition of lecithin adapted for aerosol delivery onto cookare for cooking surface lubrication, the composition consisting essentially per 100 parts by weight of (a) an organic phase free of liquid alkanes having a specific gravity below 0.75, which phase comprises in proportions to provide to the composition an acid number not higher than 12: from 1 to 10 parts of a lecithin having an acid number between about 24 and 34; from 0 to about 8 parts of a vegetable oil having an acid number less than about 1; from about 1 to 12 parts of a mineral oil having a specific gravity above 0.80; and an emulsifying-effective amount of an edible fatty acid ester emulsifier having an acid number not higher than 15; and (b) up to 85 parts of an inorganic phase comprising the balance to 100 parts of the composition, which inorganic phase comprises water. The mineral oil specific gravity may range from 0.83 to 0.91 and range from light to heavy to have a viscosity of 50–60 SUS to as high as 450 SUS or more at 100° F.

Typically the vegetable oil is the glyceryl ester of a fatty acid, e.g. of lauric, linoleic, oleic, or linolenic acids. The emulsifier may typically comprise one or more of mono- and diglycerides of fatty acids, phosphate esters of mono- and diglycerides, sorbitan mono- and trioleates, and sorbitan mono and tristearates. Typical liquid alkanes excluded from the compositions are octane, nonane, and decane.

There may be included in relatively higher water content products, an organic polyol additive, which preferably is present in an amount between 1 and 5 parts by weight per 100 parts of the composition, and typically comprises one or more of glycerol, sorbitol, propylene glycol, glucose, dextrose, lactose, and sucrose, i.e. organic polyols of the formula $(R)-OH_x$, in which R is representative of a saturated aliphatic moiety having from 3 to 12 carbon atoms, and a valence of $x$, wherein $x$ is an integer from 2 to 6, and particularly sorbitol and glycerol.

Generally, relatively small amounts of lecithin are effective and used. Thus, lecithin may typically be present in an amount from 2 to 4 parts by weight per 100 parts of the composition, although the broader range is useful for specific purpose products.

In particularly preferred embodiments, there is provided a freeze-thaw stable, water-in-oil emulsion composition of lecithin adapted for aerosol delivery onto cookware for cooking surface lubrication, the emulsion composition consisting essentially per 100 parts by weight of (a) an organic phase free of liquid alkanes having a specific gravity below 0.75, said organic phase comprising in proportions to provide the composition an Acid No. not higher than 12: from 2 to 4 parts of lecithin having an Acid No. between about 24 and 34; from about 2 to about 8 parts of a vegetable oil having an Acid No. less than about 1 and comprising a glyceryl ester of fatty acid; from about 2 to 7 parts of a mineral oil having a specific gravity not less than 0.75; from 2 to 4 parts of a polyol additive comprising glycerol, sorbitol, propylene glycol, glucose, dextrose, sucrose and mixtures thereof; and from 2 to 4 parts of fatty acid emulsifier having an Acid No. not higher than 15; and (b) from 50 to 90 and preferably up to 85 parts of an inorganic phase comprising the balance to 100 parts of the composition, which inorganic phase comprises water. Highly preferred compositions employ sorbitol or glycerol as the polyol; a vegetable oil selected from soybean oil, safflower oil, peanut oil, olive oil, corn oil, coconut oil, cottonseed oil, palm nut oil, apricot kernal oil and mixtures comprising one or more such oils; and water phase in an amount from 70 to 85 parts by weight per 100 parts of the emulsion composition.

As noted the described lecithin emulsion composition is adapted for aerosol propellant delivery and for this purpose, the invention further contemplates a package comprising a valved, pressure-resistant container, and within the container the emulsion composition described, and also propellant comprising normally gaseous materials liquefiable at pressures less than about 90 psig and selected from hydrocarbons containing from 3 to 5 carbon atoms inclusive, chloro- and/or fluoro-substituted hydrocarbons containing from 1 to 6 carbon atoms, carbon dioxide, nitrogen, nitrous oxide and mixtures thereof, in an amount sufficient to propel the composition from the container responsive to valve actuation. Typically the package may contain from 1 part weight of the emulsion composition per 3 parts by weight of propellant and may range from about 1 to 4 parts of propellant per part of emulsion composition.

DESCRIPTION OF THE PREFERRED EMBODIMENTS

It has been noted of the aforedescribed compositions that at the relatively lower water content, the polyol additive may be dispensed with while retaining the desired freeze thaw stability. As relative water content increases, use of a polyol is preferred. As previously mentioned this invention is specifically concerned with particular formulations of water-in-oil emulsions which when packaged for aerosol propellant delivery will maintain its integrity despite being subjected to repeated freeze-thawcycles during the course of shipment to the consumer. It is commercially important that lecithin emulsion products being shipped through freezing and lower temperature zones not "break" their emulsified condition upon thawing, to leave a watery, heterogenous mixture, oil-in-water system, very different in properties from the originally prepared water-in-oil emulsion system. The consumer may notice, for example that the oil-in-water (broken emulsion) system runs and steams when heated in a pan; whereas the intended water-in-oil system will nearly invisibly vaporize when so heated. Naturally prior art systems which were organic solvent solutions of lecithin, being anhydrous, did not have problems with water freezing during shipment, but water-containing emulsion systems are subject to this failing in the absence of preventative action. The consumer expects uniformity of product and consistency of behavior; erratic appearance is a source of consumer complaint, even if function is not technically affected.

It has now been discovered that the defined lecithin system in which both components and concentrations are controlled to maintain a critical Acid No. level will inhibit or prevent these desired water-in-oil emulsions from a "breaking" reversion to a watery, oil-in-water heterogeneity despite repeated cycling through freeze-thaw conditions; it is further true of the compositions herein disclosed that hydrolysis of the vegetable oil and ester components is inhibited in the presence of the polyol additive, that such results are obtained when the composition is free of liquid alkanes as mentioned; and that the use of a polyol additive is helpful to obtaining best results when the water content is relatively high, reducing another problem encountered in aerosol propellant packaged lecithin spray systems.

With reference to specific components of the present compositions, useful lecithins are adequately described in the several patents noted hereinabove, commercially available lecithins being preferred for availability and cost advantages. Such lecithins typically are sticky and viscous materials dispersed in soy oil, their phosphated content being surface active at least in conjunction with other components of the present compositions. As is known, a part of the lecithin phosphatide molecule is hydrophilic, another part hydrophobic. The utility of lecithin as a pan lubricant derives from its resultant surface active properties enabling the lecithin to emulsify, stabilize, lubricate, inhibit fat hydrolysis and act as an anti-oxidant. Lecithins useful herein have an Acid No. of 24-34. "Acid No." herein has reference to milligrams of KOH neutralized per gram of material. Lecithins having Acid No. values in excess of 34 are prone to formation of an oil-in-water emulsion. Lecithin is typically present in an amount of from about 1 to 10 and preferably 2 to 4 parts per 100 parts by weight of the composition.

In addition to the described lecithin, the organic phase employs per 100 parts by weight, from about 2 to about 8 parts of a vegetable oil having an Acid No. less than about 1, such as a food grade salad oil. Soy oil is low in cost and effective, and it is akin to the soy oil found in soybean lecithin. Generally vegetable oils comprising glyceryl esters of fatty acids such as lauric, linoleic, oleic or linolenic acids are useful. Specific oils that may be mentiond are these, having an Acid No. of less than about 1: safflower oil, peanut oil, olive oil, corn oil, coconut oil, cottonseed oil, palm nut oil, apricot oil and mixtures thereof with one another and other suitable vegetable oils i.e. oils that are food safe and have the desired Acid No. characteristic.

The composition organic phase further contains edible, food grade emulsifiers, liquid or semi-solid compounds functioning to promote water-in-oil emulsions, and themselves having an Acid No. not higher than 15, such as and typically those comprising one or more of monoglycerides and diglycerides of fatty acids, monosodium phosphate esters of monoglycerides and diglycerides, sorbitan monooleate and sorbitan monostearate. Useful commercial emulsifiers are Atmos 300, Span 85, Atmul 86VS and Atmul 80. The composition organic phase further contains a small but effective amount of mineral oil for the amelioration of freeze-thaw maleffects: phase separation, emulsion inversion, watery appearance and the like; such mineral oil having a specific gravity not less than 0.80, preferably 0.83 to 0.91 and optimally above 0.87. Generally from 1 to 12 parts by weight per 100 parts of the total composition are employed of the mentioned mineral oils sometimes referred to in the trade as liquid petrolatum or white mineral oils, being mixtures of hydrocarbons derived from petroleum and characterized by the noted range of specific gravity, a viscosity of 50–60 to 450 or more Saybolt Universal Seconds (SUS) at 100° F.

The organic phase in relatively high water content systems further includes, in some embodiments hereof, a small amount of a polyol additive e.g. from 1 to 5 parts by weight per 100 parts of the total composition, lower or higher amounts being usable but less effective or unnecessary respectively. The use of polyol additive in the composition in conjunction with the mineral oil component described above, assists in maintaining the emulsion particularly at water content levels of 70–85 parts per 100 parts of the composition and above. Suitable polyols are those acceptable for use in a food product; preferred is the use of 2 to 4 parts of organic polyols having the structural formula (R)—OH$_x$ in which R is a saturated aliphatic moiety having from 3 to 12 carbon atoms and a valence of $x$, $x$ being an integer from 2 to 6. Thus useful polyols typically have a molecular weight between 76 and 360 and include glycerol, sorbitol, propylene glycol, glucose, dextrose and sucrose. Sorbitol or glycerol is the preferred polyol component of the composition.

The inorganic or (b) phase of the composition is water and generally comprises from 50 to 90 parts by weight per 100 parts of the composition, and preferably 70 to 85 parts thereof, and when a polyol additive is used up to 85 parts.

EXAMPLE

An aerosol propellant packaged freeze thaw stable lecithin emulsion was prepared as follows. To a pressure resistant conventional aerosol container there was added (a) an organic phase warmed to about 40° to be above room temperature of 20° C and comprising (parts by weight):

Lecithin — 4.2 parts
Soy oil — 8.2 parts
Atmos 300 — 3.6 parts
Mineral oil (50-60 SUS at 100° F) — 7.3 parts and an inorganic phase comprising
Water — 76.7 parts The container top and valve were crimped on to close the container contents to the atmosphere and propellant (a mixture of propane, isobutane and n-butane) was injected at a weight ratio of 3 to 1 of emulsion composition to propellant under pressure through the valve, to provide a pressure of 46–70 psig within the container. The liquid phases were emulsified to a water in oil emulsion. In the absence of the mineral oil the water-in-oil emulsion is not realized.

Other propellants can be used, including hydrocarbons and halo-substituted hydrocarbons and inorganic gases, such as nitrogen, carbon dioxide and nitrous oxide, provided that dispensing pressures e.g. 40–90 psig are obtained. Preferred propellants are those nomally gaseous materials liquefiable at pressures less than about 90 psig and comprising hydrocarbons containing from 3 to 5 carbon atoms inclusive, chlorine and/or fluorine substituted hydrocarbons containing from 1 to 6 carbon atoms, carbon dioxide, nitrogen, nitrous oxides and mixtures thereof.

The packaged product of Example I was stored in a home refrigerator freezer for 8 hours at 0° F. The product was then allowed to thaw at room temperature about 20° C for about 4 hours. This cycle was repeated time and again. Following the thaw portion of the cycles, the product spray was occasionally evaluated for appearance on a surface. In each instance the appearance was room temperature of 20° C and comprising (parts by weight):

Lecithin — 4.2 parts
Soy oil — 8.2 parts
Atmos 300 — 3.6 parts
Mineral oil (50-60 SUS at 100° F) — 7.3 parts
and an inorganic phase comprising
Water — 76.7 parts The container top and valve were crimped on to close the container contents to the atmosphere and propellant (a mixture of propane, isobutane and n-butane) was injected at a weight ratio of 3 to 1 of emulsion composition to propellant under pressure through the valve, to provide a pressure of 46 psig within the container. The liquid phases were emulsified to a water in oil emulsion. In the absence of the mineral oil the water-in-oil emulsion is not realized.

Other propellants can be used, including hydrocarbons and halo-substituted hydrocarbons and inorganic gases, such as nitrogen, carbon dioxide and nitrous oxide, provided that dispensing pressures e.g. 40–90 psig are obtained. Preferred propellants are those nomally gaseous materials liquefiable at pressures less than about 90 psig and comprising hydrocarbons containing from 3 to 5 carbon atoms inclusive, chlorine and/or fluorine substituted hydrocarbons containing from 1 to 6 carbon atoms, carbon dioxide, nitrogen, nitrous oxides and mixtures thereof.

The packaged product of Example I was stored in a home refrigerator freezer for 8 hours at 0° F. The product was then allowed to thaw at room temperature about 20° C for about 4 hours. This cycle was repeated time and again. Following the thaw portion of the cycles, the product spray was occasionally evaluated for appearance on a surface. In each instance the appearance was homogeneous and attractive.

The efficacy of the product was evaluated by spraying the product into muffin tin cups and baking muffins. After baking was complete the tins were inverted. Use of the above product resulted in 100% of the muffins dropping out, indicative of good lubricating performance by the product.

EXAMPLE II

An aerosol propellant packaged freeze thaw stable lecithin emulsion having increased water content was prepared as follows. To a pressure resistant conventional aerosol container there was added:

(a) an organic phase warmed to about 40° to be above room temperature of 20° C and comprising (parts by weight):

Lecithin — parts
Soy oil — parts
Atmos 300 — parts
Mineral oil (50-60 SUS at 100° F.) — parts
Sorbitol — parts
and an inorganic phase comprising
Water — parts The container top and valve were crimped on to close the container contents to the atmosphere and propellant (a mixture of hydrocarbons) was injected at a weight ratio of 3 to 1 of emulsion composition to propellant under pressure through the valve, to provide a pressure of 70 psig within the container. The liquid phases were emulsified to a water in oil emulsion.

The packaged product of the Example was stored in a home refrigerator freezer for 8 hours at 0° F. The product was then allowed to thaw at room temperature about 20° C for about 4 hours. This cycle was repeated time and again. Following the thaw portion of the cycles, the product spray was occasionally evaluated for appearance on a surface. In each instance the appearance was uniform, homogeneous and attractive. By contrast, a comparable water content formulation not containing the polyol additive underwent emulsion breakdown when similarly cycled and evaluated.

The example formulation, and others herein may employ small but effective amounts of the usual additives for their usual purposes. Thus flavoring and coloring agents e.g. vanillin, synthetic butter oil, carotene coloring matter, and other additives such as preservatives may be used.

I claim:

1. A freeze-thaw-stable water-in-oil emulsion composition of lecithin adapted for aerosol delivery onto cookware for cooking surface lubrication, said stabilized emulsion composition consisting essentially per 100 parts by weight of (a) an organic phase free of liquid alkanes having a specific gravity below 0.75, which phase comprises in proportions to provide to the composition an Acid No. not higher than 12: from 1 to 10 parts of a lecithin having an Acid No. between about 24 and 34; from about 0 to about 8 parts of vegetable oil having an Acid No. less than about 1: from 1 to 12 parts of a mineral oil having a specific gravity above 0.80, and an emulsifying effective amount of an edible fatty acid ester emulsifier having an Acid No. not higher than 15; and up to 90 parts of an inorganic phase comprising the balance to 100 parts of the composition, which phase comprises water.

2. Emulsion composition according to claim 1 in which said vegetable oil is the glyceryl ester of a fatty acid.

3. Emulsion composition according to claim 2 in which said ester is an ester of lauric, linoleic, oleic, or linolenic acid.

4. Emulsion composition according to claim 1 in which said emulsifier comprises one or more of mono- and di-glycerides of fatty acids, monosodium phosphate esters of mono and di-glycerides, sorbitan mono - and tri oleates, and sorbitan mono and tri-stearates.

5. Emulsion composition according to claim 1 in which said mineral oil has a Saybolt Viscosity above 50° at 100° F.

6. Emulsion composition according to claim 1 in which said composition comprises up to parts of said aqueous phase and including also an organic polyol having a molecular weight between about 76 and 360 present in an amount between 1 and 5 parts by weight per 100 parts of the composition.

7. Emulsion composition according to claim 1 in which said organic polyol has the formula $(R)—OH_x$, in which R is representative of a saturated aliphatic moiety having from 3 to 12 carbon atoms and a valence of $x$, and $x$ is an integer from 2 to 6.

8. Emulsion composition according to claim 7 in which said polyol comprises one or more of glycerol, sorbitol, propylene glycol, glucose, dextrose and sucrose.

9. Emulsion composition according to claim 8 in which said lecithin is present in an amount from 2 to 4 parts by weight per 100 parts of the composition, and in which said mineral oil has a Saybolt Viscosity of 50–450 at 100° F.

10. Emulsion composition according to claim 9 in which said polyol is sorbitol or glycerol.

11. A package comprising a valved, pressure-resistant container and within the container the emulsion composition according to claim 1, and also propellant selected from the group consisting of normally gaseous materials liquefiable at pressures less than about 90 psig and selected from hydrocarbons containing from 3 to 5 carbon atoms inclusive, chlorine and/or fluorine substituted hydrocarbons containing from 1 to 6 carbon atoms, carbon dioxide, nitrogen, nitrous oxide, and mixtures thereof, in an amount sufficient to propel said composition from the container responsive to valve actuation.

12. A freeze-thaw stable, water-in-oil emulsion composition of lecithin adapted for aerosol delivery onto cookware for cooking surface lubrication, said emulsion composition consisting essentially per 100 parts by weight of (a) an organic phase free of liquid alkanes having a specific gravity below about 0.75, which phase comprises in proportions to provide the composition an Acid No. not higher than 12: from 2 to 4 parts of lecithin having an Acid No. between about 24 and 34; from about 2 to about 8 parts of a vegetable oil having an Acid No. less than about 1 and comprising a glyceryl ester of a fatty acid; from about 2 to 7 parts of mineral oil having a specific gravity not less than 0.87; from 2 to 4 parts of a polyol additive comprising glycerol, sorbitol, propylene glycol, glucose, dextrose or sucrose polyol or mixtures thereof; and from 2 to 4 parts of fatty acid emulsifier having an Acid No. not higher than 15; and (b) from 50 to 90 parts of an inorganic phase comprising the balance to 100 parts of the composition, which inorganic phase comprises water.

13. Emulsion composition according to claim 12 in which said polyol is sorbitol or glycerol.

14. Emulsion composition according to claim 13 in which said vegetable oil comprises one or more of soybean oil, safflower oil, peanut oil, olive oil, corn oil, coconut oil, cottonseed oil, palm nut oil and apricot kernal oil.

15. Emulsion composition according to claim 14 in which said polyol is sorbitol or glycerol.

16. Emulsion composition according to claim 15 in which said water inorganic phase comprises from 70 to 85 parts by weight per 100 parts of said composition.

17. A package comprising a valved, pressure resistant container and within the container the emulsion composition according to claim 16 and propellant in an amount sufficient to propel said composition from the container responsive to valve actuation.

18. The package according to claim 17 in which said propellant is selected from the group consisting of normally gaseous materials liquefiable at pressures less than about 90 psig and comprising hydrocarbons containing from 3 to 5 carbon atoms inclusive, chlorine and/or fluorine substituted hydrocarbons containing from 1 to 6 carbon atoms, carbon dioxide, nitrogen, nitrous oxide, and mixtures thereof.

19. The package according to claim 18 in which said package contains from 1 to 4 parts by weight of propellant per part of emulsion composition.

* * * * *

UNITED STATES PATENT OFFICE
CERTIFICATE OF CORRECTION

Patent No. 4,073,412                    Dated February 14, 1978

Inventor(s)   Charles Doumani

It is certified that error appears in the above-identified patent and that said Letters Patent are hereby corrected as shown below:

Column 2, line 8, for "cookare" read ---cookware---.

Column 5, line 49, for "nomally" read ---normally---.

Column 5, delete lines 63 to 68.

Column 6, delete lines 1 to 29.

Column 6, line 46, for "Lecithin - parts" read ---Lecithin---.

Column 6, line 47, for "Soy oil - parts" read ---Soy oil---.

Column 6, line 48, for "Atmos 300 - parts" read ---Atmos 300---.

Column 6, line 49, for "Mineral oil (50-60 SUS at 100°F.) - parts" read ---Mineral oil (50-60 SUS at 100°F.)---.

Column 6, line 50, for "Sorbitol - parts" read ---Sorbitol---.

UNITED STATES PATENT OFFICE
CERTIFICATE OF CORRECTION

Patent No. 4,073,412  Dated February 14, 1978

Inventor(s) Charles Doumani

It is certified that error appears in the above-identified patent and that said Letters Patent are hereby corrected as shown below:

Column 6, line 52, for "Water - Parts" should read -- Water --.

Signed and Sealed this

Thirteenth Day of June 1978

[SEAL]

Attest:

RUTH C. MASON
Attesting Officer

DONALD W. BANNER
Commissioner of Patents and Trademarks